US012115563B1

(12) United States Patent
Thimmesh Rachie

(10) Patent No.: US 12,115,563 B1
(45) Date of Patent: Oct. 15, 2024

(54) FAUCET CLEANING SYSTEM

(71) Applicant: Jaimie Thimmesh Rachie, North Hollywood, CA (US)

(72) Inventor: Jaimie Thimmesh Rachie, North Hollywood, CA (US)

(73) Assignee: Faucet Fighter LLC., Minneapolis, MN (US)

( * ) Notice: Subject to any disclaimer, the term of this patent is extended or adjusted under 35 U.S.C. 154(b) by 0 days.

(21) Appl. No.: 18/210,108

(22) Filed: Jun. 15, 2023

(51) Int. Cl.
*B08B 3/08* (2006.01)
*B08B 9/02* (2006.01)
*C11D 3/37* (2006.01)
*C11D 17/04* (2006.01)

(52) U.S. Cl.
CPC ................ *B08B 3/08* (2013.01); *B08B 9/021* (2013.01); *C11D 3/3753* (2013.01); *C11D 17/044* (2013.01); *B08B 2209/02* (2013.01); *C11D 2111/16* (2024.01); *E03C 2201/70* (2013.01)

(58) Field of Classification Search
CPC ....... B08B 3/08; B08B 9/021; B08B 2209/02; C11D 3/3753; C11D 17/044; C11D 2111/16; E03C 2201/70
See application file for complete search history.

(56) References Cited

U.S. PATENT DOCUMENTS

| | | | | |
|---|---|---|---|---|
| 5,970,995 | A * | 10/1999 | Schy | B05B 15/55 134/201 |
| 8,778,862 | B2 | 7/2014 | Hernandez et al. | |
| 9,351,560 | B2 * | 5/2016 | Tussy | A46B 15/0055 |
| 2014/0289979 | A1 * | 10/2014 | Tussy | A46B 15/0055 15/104.93 |
| 2016/0016190 | A1 * | 1/2016 | Buswell | B05B 15/55 220/475 |
| 2016/0317397 | A1 | 11/2016 | Wenz et al. | |
| 2018/0071763 | A1 * | 3/2018 | Croghan | A46B 15/0091 |
| 2020/0306784 | A1 * | 10/2020 | Brasseur | B08B 3/08 |
| 2023/0026016 | A1 | 1/2023 | Leverich | |
| 2023/0123172 | A1 * | 4/2023 | Pavlack | B05B 15/55 134/18 |

* cited by examiner

*Primary Examiner* — Benjamin L Osterhout
(74) *Attorney, Agent, or Firm* — Plager Schack LLP; Mark H. Plager; Naomi Mann

(57) ABSTRACT

A faucet cleaning system provides a water dissolvable applicator formed from a thin sheet material which is stretchable and shaped to define a sleeve configured to encapsulate a faucet head. A cleaning agent is contained within the applicator via a water dissolvable film and is configured to release upon contact with moisture on the faucet head.

12 Claims, 3 Drawing Sheets

FAUCET CLEANING SYSTEM

BACKGROUND

The present disclosure relates generally to devices and systems for cleaning faucets.

The cleanliness of faucets/showerheads may affect sanitation, and/or aesthetic appearance of a home, hotel, commercial building, etc. However, manual cleaning may be difficult, time consuming, and inefficient. Furthermore, improper cleaning may damage the exterior surface of the fixture. As such, an improved cleaning system is desirable.

SUMMARY

According to various embodiments, disclosed is a faucet cleaning system, comprising a water dissolvable applicator formed from a thin sheet material which is stretchable and shaped to define a sleeve configured to encapsulate a faucet head, said sleeve having an inner cavity and a rim; and a cleaning agent contained via a water dissolvable film within the inner cavity of the applicator, wherein the applicator is configured to stretch over the faucet head, and wherein the rim of the applicator is configured to friction cling against an exterior side of the faucet head.

In some embodiments, the faucet head is a component of a sink faucet or a showerhead. In some embodiments, the applicator is made of a PVA (Polyvinyl alcohol) material. In certain embodiments, the water dissolvable film containing the cleaning agent is made of a PVA material. In further embodiments, the water dissolvable film containing the cleaning agent forms a pouch within the applicator. In some embodiments, the water dissolvable film containing the cleaning agent is configured to dissolve upon contact with moisture on the faucet head to release the cleaning agent into the applicator, while the applicator remains intact. In some further embodiments, the applicator is configured to dissolve upon water flowing from the faucet head.

According to further embodiments, disclosed is a faucet cleaning method, comprising installing a water dissolvable applicator around a wet faucet head, the water dissolvable applicator formed from a thin sheet material which is stretchable and shaped to define a sleeve configured to encapsulate the faucet head, said sleeve having an inner cavity and a rim, the water dissolvable applicator further configured to release a cleaning agent contained via a water dissolvable film within the applicator, wherein applicator is configured to stretch over the faucet head, wherein the rim of the applicator is configured to friction cling against an exterior side of the faucet head, and the cleaning agent is configured to release upon contact with moisture on the faucet head. In certain embodiments, the method further comprises leaving the installed applicator on the faucet head for a time period sufficient to effectuate cleaning of the faucet head by cleaning agent released from the applicator. In certain embodiments, the method further comprises running a water flow from the faucet head to dissolve the applicator after the faucet head has been cleaned by the released cleaning agent. In some embodiments, the applicator and water dissolvable film are made of a PVA material.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
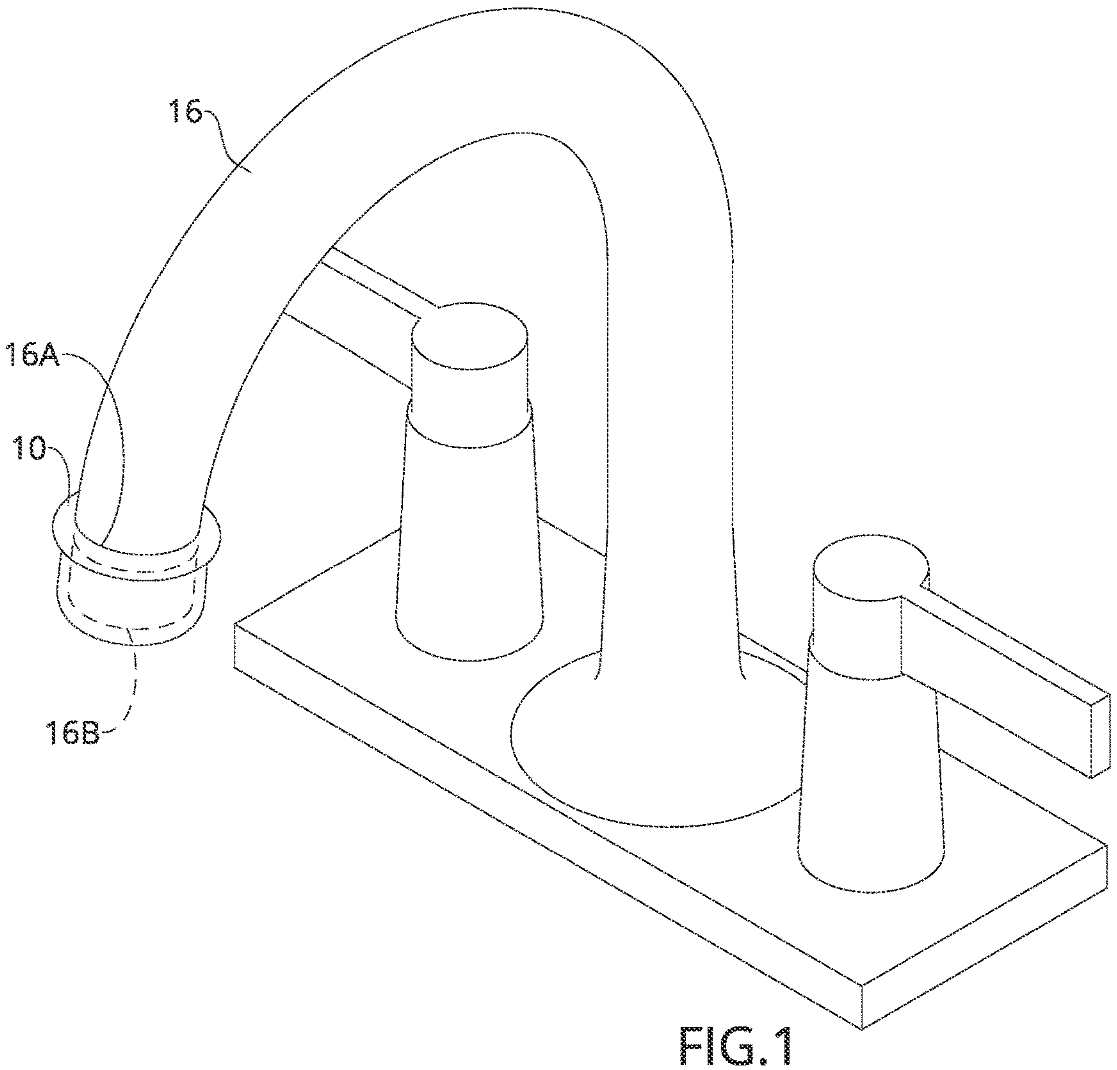
FIG. 1 depicts a faucet cleaning system comprising a cleaning applicator shown installed to a faucet, according to various embodiments.
Figure 2:
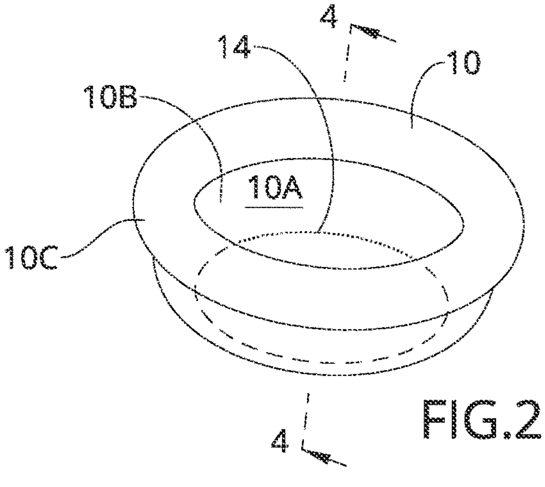
FIG. 2 is a perspective view of the applicator.
Figure 3:
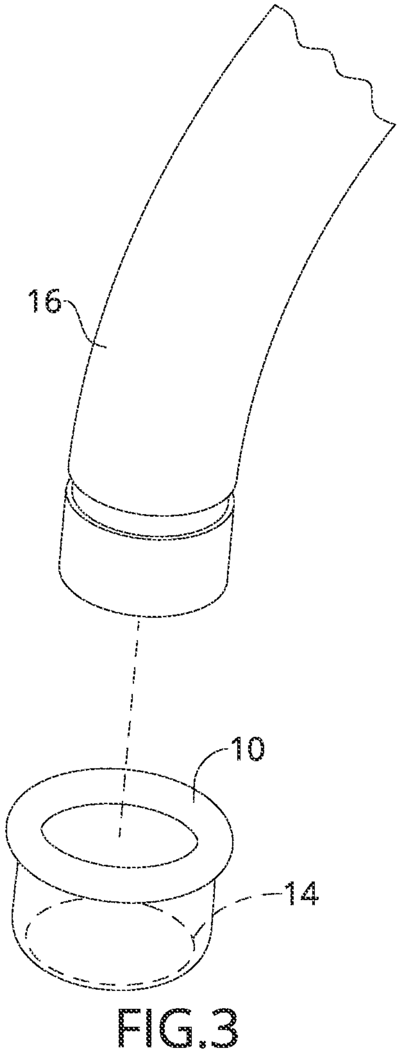
FIG. 3 illustrates the applicator detached from the faucet.
Figure 4:
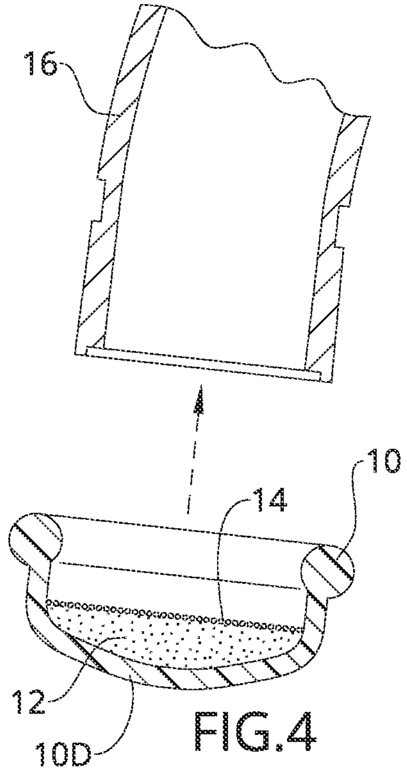
FIG. 4 is a section view of the applicator (taken along line 4-4 in FIG. 2) and of the faucet, illustrating installation of the applicator to the faucet.
Figure 5:
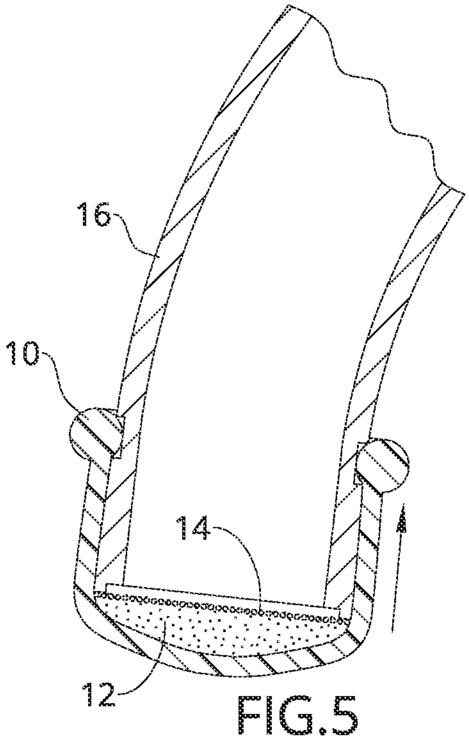
FIG. 5 is a section view showing the applicator attached to the faucet.
Figure 6:
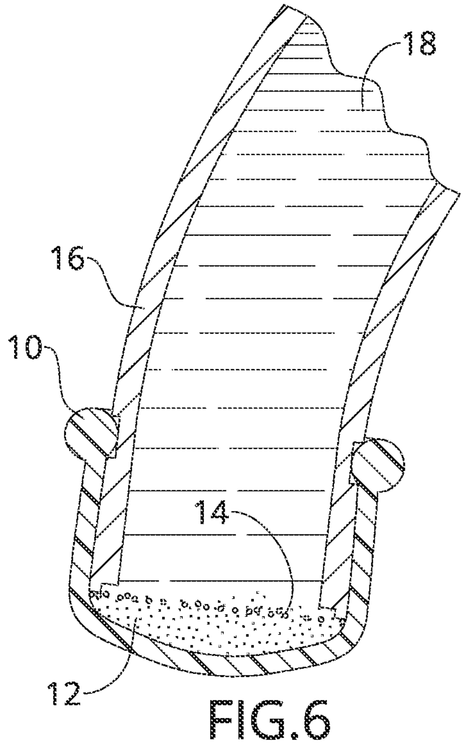
FIG. 6 is a section view illustrating activation of the applicator by turning on the water.
Figure 7:
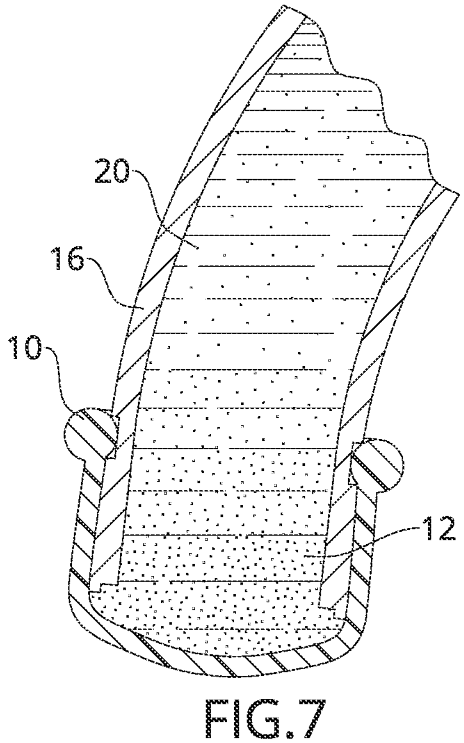
FIG. 7 is a section view showing the release of a cleaning agent from an interior pouch of the applicator.

According to various embodiments as depicted in FIGS. 1-6 disclosed is a faucet cleaning system which provides an applicator 10 configured to apply a cleaning agent 12 contained within the applicator to a faucet 16, for hands-free cleaning of the faucet head components (such as the faucet spout, aerator, pipe tip, etc.). In embodiments, faucet 16 may be a kitchen sink faucet, a bathroom sink faucet, a showerhead, and the like.

In embodiments, applicator functions as an encapsulating sleeve which friction fits to the faucet head to expose the faucet head to cleaning agent 12 for a time period sufficient to effectuate proper cleaning, sanitization, and/or buildup removal. In some embodiments, cleaning agent 12 may be contained within an interior pouch 14 provided inside applicator 10. In further embodiments, interior pouch 14 may be water soluble (i.e., dissolvable), such that it dissolves upon contact with water 18 to release cleaning agent 12. In further embodiments, applicator 10 may be water soluble, such that it may dissolve and be washed away after use.

In certain embodiments, applicator 10 may comprise a balloon-like sleeve formed from a thin sheet material 10A, and including an inner cavity 10B, and a rim 10C. In some embodiments, sheet material 10A may be stretchable, enabling applicator 10 to be stretch fitted over faucet 16, wherein rim 10C may form a tight seal against the faucet exterior side 16A to capture the faucet opening 16B within applicator 10. In certain embodiments, applicator 10 may be made of a stretchable PVA material, which may further be water soluble.

In some embodiments, interior pouch 14 may comprise a dissolvable film configured to position directly below faucet opening 16B when applicator 10 is installed to the faucet 16. In certain embodiments, the dissolvable film is designed to dissolve upon contact with a wet faucet head. This enables cleaning agent 12 to be released, while the material 10A of the applicator remains intact. As such, the released cleaning agent 12 is kept in contact with the portion of faucet 16 captured within applicator 10 to clean it. In some embodiments, the dissolvable film of interior pouch 14 may be bonded along a bottom section 10D of inner cavity 10B to form interior pouch 14 cooperatively with bottom section 10D. In other embodiments, interior pouch 14 may be a separate pod unit formed entirely from dissolvable film 12 and unconnected to inner cavity 10B.

As such, applicator 10 provides a PVA film sleeve/balloon that fits securely over faucet 16 and is filled with a cleaning agent to remove build-up and sanitize the faucet head. It shall be appreciated that the size and dimensions of applicator 10 and amount of cleaning agent 12 contained may vary depending on the type of faucet. For example, larger sizes may be provided for a showerhead versus a sink faucet. According to an exemplary embodiment, applicator 10 may contain approximately 2 to approximately 25 grams of cleaning agent 12. In certain embodiments, an applicator for a sink faucet may contain approximately 3 to approximately 7 grams of cleaning agent 12. In certain embodiments, an applicator for a showerhead may contain approximately 10 to approximately 25 grams of cleaning agent 12. It shall be appreciated that the amount of cleaning agent will vary in alternate embodiments depending on factors such as the size/dimensions of the faucet, strength/concentration of the cleaning agent, etc.

In certain embodiments, a user may fit the applicator around a faucet which is wet and/or slightly dripping (then turn off the waterflow) to dissolve interior pouch 14/dissolvable film, but not the applicator itself. This exposes the cleaning agent directly to the faucet. The applicator may then be left for a period of time, e.g., 5 minutes on the faucet, allowing the cleaning agent to work. Thereafter, the user may turn on the water 18 to dissolve the applicator and wash away any remaining cleaning agent.

The disclosed subject matter thus provides an easy and effective system which effectuates cleaning of the faucet with minimal effort, and without the need for scrubbing or risking damage to the faucet. It further facilitates regular cleaning of the fixtures, which can prevent buildup of bacteria, mold, lime, calcium mineral deposits, rust, etc., which may adversely affect water flow and quality. A user may simply connect applicator 10 to a faucet, similar to attaching a water balloon.

As used in here, the terms faucet and faucet head shall apply to any type of pluming fixture water outlet, including showerheads, kitchen faucets, bathroom faucets, and the like.

It shall be appreciated that the disclosed device and system can have multiple configurations in different embodiments. It shall be appreciated that the disclosed device and system may be applied to other components of a faucet, and/or to other items that may be difficult to clean.

It shall be appreciated that the device and system described herein may comprise any alternative known materials in the field and be of any size and/or dimensions. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A faucet cleaning system, comprising:

a water dissolvable applicator formed from a sheet material which is stretchable and configured to encapsulate a faucet head, said applicator having an inner cavity and a rim; and a cleaning agent contained via a water dissolvable film within the inner cavity of the applicator, wherein the applicator is configured to stretch over the faucet head, and wherein the rim of the applicator is configured to friction cling against an exterior side of the faucet head to attach the applicator to the faucet head, wherein the water dissolvable film is configured to position directly below a faucet opening of the faucet head when the water dissolvable applicator is attached to the faucet head such that water from the faucet opening contacts the water dissolvable film before contacting the water dissolvable applicator.

2. The faucet cleaning system of claim 1, wherein the faucet head is a component of a sink faucet or a showerhead.

3. The faucet cleaning system of claim 2, wherein the applicator is configured to dissolve upon water flowing from the faucet opening.

4. The faucet cleaning system of claim 1, wherein the applicator is made of a PVA material.

5. The faucet cleaning system of claim 1, wherein the water dissolvable film containing the cleaning agent is made of a PVA material.

6. The faucet cleaning system of claim 1, wherein the water dissolvable film containing the cleaning agent forms a pouch within the applicator.

7. The faucet cleaning system of claim 1, wherein the water dissolvable film containing the cleaning agent is configured to dissolve upon contact with moisture on the faucet head to release the cleaning agent into the applicator, while the applicator remains intact.

8. A faucet cleaning method, comprising:

installing a water dissolvable applicator around a wet faucet head, the water dissolvable applicator formed from a sheet material which is stretchable and configured to encapsulate the faucet head, said applicator having an inner cavity and a rim, the water dissolvable applicator further configured to release a cleaning agent contained via a water dissolvable film within the inner cavity of the applicator, wherein the applicator is configured to stretch over the faucet head, wherein the rim of the applicator is configured to friction cling against an exterior side of the faucet head to attach the applicator to the faucet head, wherein the water dissolvable film is configured to position directly below a faucet opening of the faucet head when the water dissolvable applicator is attached to the faucet head such that water from the faucet opening contacts the water dissolvable film before contacting the water dissolvable applicator, wherein the cleaning agent is configured to release upon contact with moisture on the faucet head; and leaving the installed applicator on the faucet head for a time period sufficient to effectuate cleaning of the faucet head by cleaning agent released from the applicator.

9. The faucet cleaning method of claim 8, further comprising running a water flow from the faucet opening to dissolve the applicator after the faucet head has been cleaned by the released cleaning agent.

10. The faucet cleaning method of claim 8, wherein the applicator and water dissolvable film are made of a PVA material.

11. The faucet cleaning method of claim 8, wherein a time period sufficient to effectuate cleaning of the faucet head is between 1 to 30 minutes.

12. The faucet cleaning method of claim 8, wherein the faucet head is moistened by turning on the faucet before installing the applicator.

* * * * *